United States Patent [19]
Knapman et al.

[11] Patent Number: 5,872,971
[45] Date of Patent: Feb. 16, 1999

[54] DATA PROCESSING SYSTEMS AND METHODS PROVIDING INTEROPERABILITY BETWEEN DATA PROCESSING RESOURCES

[75] Inventors: John Michael Knapman, Eastleigh; James York, Morden, both of United Kingdom

[73] Assignee: International Business Machines Corporation, Armonk, N.Y.

[21] Appl. No.: 753,117

[22] Filed: Nov. 20, 1996

[30]     Foreign Application Priority Data

Dec. 20, 1995 [GB] United Kingdom ............... 9526016

[51] Int. Cl.$^6$ ........................................... G06F 9/00
[52] U.S. Cl. ................................. 395/671; 395/683
[58] Field of Search .......................... 395/703, 701, 395/683, 671, 672

[56]            References Cited

U.S. PATENT DOCUMENTS

| | | | |
|---|---|---|---|
| 5,511,196 | 4/1996 | Shackelford et al. | 395/683 |
| 5,615,362 | 3/1997 | Jensen et al. | 707/103 |

FOREIGN PATENT DOCUMENTS

| | | |
|---|---|---|
| 0613083 | 8/1994 | European Pat. Off. . |
| 0623876 | 9/1994 | European Pat. Off. . |
| 2264796 | 9/1993 | United Kingdom . |

OTHER PUBLICATIONS

IBM Document No. GC33–0155–4 "CICS General Information".

IBM Document No. GC33–0754–00 "Transaction Processing—Concepts and Products".

Object Management Group, Inc.'s Object Transaction Service (OTS) specification (OMG Document 94.8.4).

IBM Technical Disclosure Bulletin, vol. 38, No. 3, Mar. 1995, pp. 617–620.

*Primary Examiner*—Majid A. Banankhah
*Attorney, Agent, or Firm*—Jeffrey S. LaBaur

[57]            ABSTRACT

Provided are transaction processing systems and methods enabling interoperation between data processing resources which implement different transaction processing models. The systems and methods also enable resources which were not created using object oriented programming techniques to interoperate with object oriented programs and to utilise object orientation concepts. The systems and methods allow transactions to be controlled using consistent operations across multiple object oriented transaction services.

A set of object classes is implemented on a transaction processing system, the object classes including: an object oriented wrapper (300) for an existing system interface; an interface implementation (310) which corresponds to a different transactional model from that of other system resources; and a transaction class (320) which maps transactional operations of one model to transactional operations of the second model, while taking account of transactional operations which are within transactional scope according to one model and outside transactional scope according to the second model.

17 Claims, 2 Drawing Sheets

DATA PROCESSING SYSTEMS AND METHODS PROVIDING INTEROPERABILITY BETWEEN DATA PROCESSING RESOURCES

FIELD OF THE INVENTION

The present invention relates to data processing systems and methods which enable interoperation between data processing resources which implement different transaction processing models.

BACKGROUND

Transaction processing

The concept of a transaction is an important programming paradigm for simplifying the construction of reliable application programs, especially those that require concurrent access to shared data. The business function of a commercial application program typically involves processing many similar items, for example orders in an order processing system or seat reservations in an airline booking system. The processing of one of these items (i.e. the execution of this discrete unit of processing) is a transaction. A sequence of associated operations which transforms a consistent state of a recoverable resource into another consistent state is known as a "unit of work". A unit of work must either be fully completed (and committed at completion of the transaction) or fully purged without action (rolled back). When a transaction is committed, all changes made by the associated requests are made permanent. Transaction processing is the management of discrete units of work that access and update shared data. A transaction may comprise one or many units of work and may be distributed across a data processing network. Distributed transaction processing involves a transaction that affects resources at more than one physical or logical location.

In a typical transaction processing environment, many users repeatedly process similar transactions. Transaction processing is particularly effective for the processing of unscheduled single items in unpredictable volumes and sequence, for changing enterprise data to reflect updates as they are processed, and for providing immediate on-line access to enterprise data that has been updated to reflect all previous transactions.

The following basic functions and characteristics are usually required of transaction processing systems:

On-line processing (for which a user needs a terminal or workstation connected to the system);

High availability (i.e. the system must be available for processing when needed—this requires automated recovery from failures and minimised impact from scheduled outages such as upgrades and database backups);

Rapid response time (to avoid users repeatedly waiting—this will typically involve prioritising and workload balancing);

Low cost per transaction and efficient throughput;

Access to and update of shared resources with integrity (see below).

The last mentioned function is particularly important. Very large numbers of transactions may read or cause changes to an enterprise's data store. It is important that transactions read valid data and that their updates are correctly recorded. Ensuring this is called maintaining data integrity. To preserve full data integrity, a transaction processing system and its applications must combine to ensure that each transaction has the four "ACID" properties of atomicity, consistency, isolation, and durability. How this is achieved depends on the specific transactional model implemented.

Figure 1A:
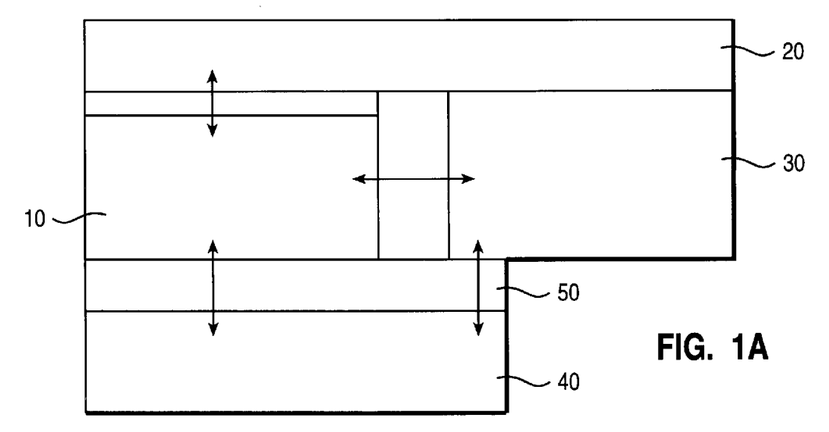
FIGS. 1a and 1b are prior art schematic representations of, respectively, independent and integrated transaction processing systems.
Figure 1B:
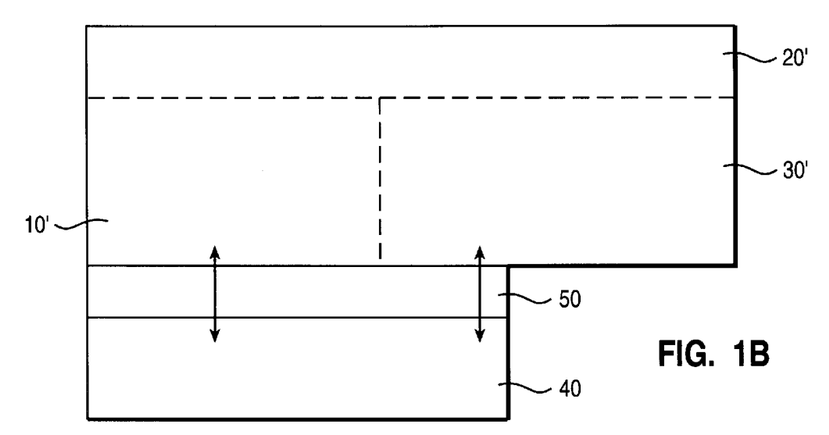

Two types of transaction processing system are known: systems including an independent transaction processing (TP) manager which runs on an operating system platform, and integrated systems in which a TP manager is built into an operating system. Independent and integrated systems are shown in FIGS. 1A and 1B respectively. Referring to FIG. 1A, an independent TP manager 10 needs interfaces to the operating system 20 and to a database management system 30, as well as providing a platform for transactional application programs 40. For integrated systems such as shown in FIG. 1B, the transaction processing manager 10' and usually also the database manager 30' are built into the operating system 20' so that the only external interface required is to the application programs 40. Application programming interfaces (APIs) 50 enable a transaction application program 40 to use the services of the transaction processing manager—services such as communications, presentation, data access and commitment control.

Further general information on transaction processing can be found in the book "Transaction Processing: Concepts and Products" (IBM document number GC33-0754-00), which is available from IBM.

A number of different transaction processing models are known in the art. Some transaction processing systems require explicit transactional demarcation—i.e. an application program must issue the relevant API commands for operations to begin, commit or rollback a transaction. This requirement is a feature of the Object Management Group, Inc.'s (OMG's) Object Transaction Service (OTS) specification—a specification for a proposed service which supports transactional behaviour in a distributed heterogeneous environment based on the OMG Common Object Request Broker Architecture (CORBA). CORBA defines the interactions between objects of an object oriented system (see below), and in particular between distributed objects in different systems. The OTS exploits object oriented programming to encapsulate the processing performed under transactional scope, allowing a programmer (or similar person) to designate certain classes of operations as transactional. The unchained model of transactions is supported since a client program can explicitly start, suspend and resume transactions. Invoking a transactional operation outside a transaction causes the operation to be performed outside the scope of any transaction. In the unchained model, a program can explicitly enter and leave the scope of transactions so that some of its execution might be within the scope of one transaction, some within the scope of another, and some outside the scope of any transaction. Unlike the non-object-oriented unchained model, in which a program can freely mix transactional and non-transactional work, OTS requires that the transactional operations be distinctly marked.

Other transaction processing systems coordinate the delimiting of transactions (e.g. commit processing) themselves, so as to ensure that the system can reliably deal with recovery in the event of a failure during processing of the transaction. The CICS on-line transaction processing programs, which are commercially available from International Business Machines Corporation, support "chained" transactions across cooperating systems. Chained transactions have the property that a program (e.g. a CICS application) is always within the scope of some transaction, and a system that implements the chained model can maintain the rule that all transactional operations must be executed under its control (by means of transaction programs in the case of CICS systems). A CICS transaction begun in one system may include operations performed by other systems, with demarcation of the transaction (e.g. commit processing) being controlled by a CICS system without requiring application-initiated demarcation operations. CICS systems do have provision for an application program to specify intermediate syncpoints as wanted, which additional delimiting of units of work can enhance recovery, but this is not an essential feature of the CICS transactional model. CICS is a trade mark of International Business Machines Corporation.

It is an important distinction between the CICS transactional model and the OTS transactional model that CICS servers manage units of work and support chained transactions whereas OTS requires client application control and implements an unchained transaction model, since the respective transactions look very different, and require different action, from the client application. This mismatch between the transactional models currently prevents interoperation between data processing resources which implement the different models.

It is thus a requirement of the prior art that, if a plurality of data processing resources within a network are to be involved in the performance of operations within a specific distributed transaction, then those data processing resources must all implement the same model of a transaction. This causes problems for organisations wishing to supplement their existing resources with resources which are based on a different model of transaction processing, or who acquire or merge with other organisations having such resources, or who wish to extend their network of computing resources to include suppliers, business partners or customers in an inter-enterprise network. Organisations increasingly need their application programs to operate across distributed heterogeneous networks, which necessitates interoperation between those data processing resources which implement different transactional models.

Object Oriented Computing

An area of significant recent development in the computing industry is the development of object-oriented (OO) computing. While the above mentioned transaction paradigm is essential to developing reliable distributed applications, the object paradigm of OO computing is key to achieving high productivity and quality in application development. Object-oriented (OO) programs differ from traditional computer programs (which are structured sequences of calculations and logic that access data) in that the data and their related calculations are grouped together. An "object" is a self-contained software package (e.g. a component, or module) which combines variables (data, attributes) and methods (procedures, processes, routines, operations) that operate on those variables to perform a specialized role (function) in a system. Methods are embedded within objects and do not operate as free-standing entities. Objects are autonomous entities and the object's data can only be manipulated by that object using the defined methods. This is known as "encapsulation". An object is defined via its "class", and is an instance of the class.

A class is a software template that defines the form of sets of similar objects. A class defines the structure of a set of objects or instances. A class also specifies the methods that define the behaviour of its instances. A class definition includes:

1. the name of the class;
2. the operations (methods) for manipulating the instances (objects) of the class;
3. the internal implementation of the interface of the objects;
4. the internal representation of objects.

Object orientation provides paradigms and tools for:

1. constructing reusable software components and easily extensible libraries of software modules.
2. easily modifying and extending implementations of components without having to recode everything from scratch.
3. modelling the real world as close to a user's perspective as possible.
4. interacting easily with a computational environment.

In OO programming, problems to be solved are broken down into sets of cooperating objects instead of into hierarchies of nested computer programs or procedures. Object orientation provides a programming style that allows efficient organization and modularization (i.e. separation of function) of large application programs. These advantages to programming style can be achieved using OO concepts and ideas even without using special OO languages, but a number of OO languages have evolved and other procedural or functional languages have been extended to include object oriented constructs. C++ is an example of one such OO-extended language which supports class hierarchies and allows subclasses to access methods and instance variables from other classes in the hierarchy.

Because of the advantages of object orientation which are mentioned above, object oriented technologies, together with recent advanced transactional concepts, are achieving widespread acceptance in the computing industry. Many organisations are recognising the advantages of targetting future investment so as to migrate from their existing data processing resources towards resources which enable the exploitation of these advanced transactional and object-oriented concepts. However, despite the benefits of such migration, it is also essential to many companies to continue to fully utilise their existing resources as they manage the migration—a company's existing stocks of computing resources may include applications, data and infrastructure built up over many years and with large capital investment.

Thus, there is firstly a requirement for systems and methods which enable interoperation between computing resources which implement different transaction processing models. In particular, it is also desirable to enable use of object-oriented programming techniques within transactional systems without sacrificing existing non-object-oriented applications, infrastructure and data. Furthermore, it is desirable to enable transactions to be controlled using consistent operations across multiple transaction services.

Copending U.S. patent application Ser. No. 08/320,357 (filed 11 Oct. 1994) describes the provision of interoperation between an object oriented transaction service and procedural transaction coordinators using a set of object classes. Although recognising that the implementation classes required to achieve such interoperation will necessarily be different for different transaction coordinators, U.S. Ser. No. 08/320,357 does not disclose a solution to the specific problem of mismatch between the chained and unchained models, where transactional operations according to one model do not have a corresponding operation within the scope of a transaction according to the second model.

IBM Technical Disclosure Bulletin vol.38, No.3, March 1995, pages 617–620, discloses the desirability of interoperation between OTS and a Resource Manager implementing the X/Open Distributed Transaction Processing (DTP) model. Described is a mapping between operations of the XA interface (defined by the DTP model) and OTS two-phase commit operations, using a subclass of the OMG Resource Class (called XAResource) and an object which creates XAResource objects and registers them with a transaction coordinator. There is no disclosure of the problem of mismatch between chained and unchained models of a transaction.

SUMMARY OF THE INVENTION

According to a first aspect of the present invention, there is provided a data processing system including data processing resources which implement a first transactional model, in which all transactional operations are performed within transactional scope, and means for interfacing between said resources and data processing resources which implement a second transactional model, in which transactional operations may be invoked and performed outside of transactional scope, thereby to enable interoperation between said different resources in the processing of a transaction, the means for interfacing including: means for mapping between transactional operations according to the second model and transactional operations according to the first model, said mapping including designating transactional operations of said second model which are invoked outside of a first transaction as separate transactions according to the first model which are isolated from said first transaction; and means for maintaining a list of said operation mappings for the transaction.

The invention thus enables, for example, operation requests from an application program which implements one transactional model to be translated to operations which are meaningful to a transaction processing manager which implements a different transactional model. This includes dealing with operations (e.g. transactional demarcation operations: Begin, Suspend or Resume) which are invoked outside of transactional scope by the application program, by performing such transactional operations as isolated transactions. Operations with equivalents within the scope of a corresponding transaction are thus mapped to those corresponding operations, and operations without such equivalents are treated as separate transactions.

Other operations which are invoked outside of transactional scope (typically business application operations) can also be performed as isolated transactions where this is desirable to deal with a mismatch between transactional models.

The invention preferably provides a solution to the mismatch between a transactional model which supports multiple concurrent transactions by means of Suspend and Resume operations, and a model which does not, by mapping the multiple concurrent transactions to multiple extended units of work scheduled within the scope of a single transaction.

According to a preferred embodiment of the invention, the mapping to operations according to the first model includes maintaining transactional state information for each active transaction. Since some operations are outside of transactional scope according to one model and within a transaction according to a different model, some way of dealing with the additional transactional states is needed. Transactional state information which is derived from transactional states according to the second model is assigned to any operations which are designated as isolated transactions, and which are outside of the transaction according to the second model. States of a transaction which are undefined for one of the models are thus recognised and mapping and associated maintenance of state information is provided for relevant operations.

Systems according to the invention thus provide for interoperation between their resources and data processing resources which implement different transactional models. A system according to the invention preferably supports a plurality of concurrent transactions, and the means for interfacing is adapted to maintain state information and a list of operation mappings for all active transactions.

Furthermore, according to a preferred embodiment of the invention, the operations of a transaction according to the transactional model of the system resources are mapped to operations of a transaction according to the second model by means of a plurality of object classes, the mapping taking account of transactional operations of the second model for which there is not a corresponding operation within transactional scope in the first model. Encapsulation of operations facilitates the execution of such "mismatched" operations as isolated transactions outside of a "matched" transaction.

Within the scope of this invention is support for procedural transaction processing systems—systems which are not based on object orientation concepts. According to a preferred embodiment of the present invention, such a system is provided with an object oriented "wrapper" for use with one of the external communication interfaces of a transaction processing manager program resident on the system, thereby making the system appear, to OO applications which connect to this interface, as an object oriented system. The OO wrapper enables OO programs to treat the procedural transaction processing manager program as a coarse-grain object, such that the procedural program and OO programs can cooperate in processing a single transaction. Encapsulation of non-OO resources within an OO wrapper is known in the art, although it is not known to provide a solution to the problem of transactional mismatch which also provides interoperation between OO and non-OO resources.

The invention, according to this preferred embodiment, enables an object oriented application program which implements one transactional model to use the resources and services of a transaction processing manager which resources do not support the same transactional model and do not implement object oriented concepts. This capability allows companies to utilise data processing resources exploiting advanced transactional and object oriented concepts whilst still fully utilising their existing stock of application programs, data and computing infrastructure.

Furthermore, an implementation of the invention which provides an OO interface in association with an existing interface of a transaction processing system makes it possible to control transactions in a consistent manner, with exactly the same operations, across a plurality of transaction services.

The external interface of the transaction processing program may be an external interface of a client program of a client-server transaction service. The isolated transactions will possess all of the properties required of a non-transactional operation, whereas the additional properties that they can be rolled back or committed may be invisible and unavailable to the client program. However, the client can rely on marking and encapsulation according to the second model to facilitate identification of the transactional operations and their performance by a server program.

According to a preferred embodiment of the invention, there is provided a transaction-oriented data processing system including data processing resources which implement a first transactional model and means for interfacing between said resources and data processing resources which implement a second transactional model different from the first, thereby to enable interoperation between said different resources in the processing of a transaction, the means for interfacing being adapted to map between the operations of a transaction according to the first model and the operations of a transaction according to the second model including mapping operations (such as demarcation) within a transaction according to said second model which have no corresponding operations within the scope of a transaction according to said first model to operations of said first model which are outside of the scope of the corresponding transaction according to the first model, the means for interfacing comprising:

a first interface defining transactional operations corresponding to the first transactional model; and an object class library including the following classes: an object oriented wrapper class encapsulating the parameter structure of the first interface and including operations to get and set parameter values; a second interface implementation defining transactional operations corresponding to the second transactional model, and adapted to cooperate with said wrapper class to control transactions; a transaction manager class for managing a list of active transactions; a transaction class for storing transactional state information, and information necessary to support interoperation between transaction manager objects and wrapper objects; and a second interface control class to invoke the methods of the second interface implementation.

A preferred embodiment of the present invention facilitates interoperation between procedural data processing resources based on a transactional model which supports chained transactions and object-oriented data processing resources based on an unchained model of transactions which requires dynamic, explicit transactional demarcation. Since transactional operations (like all "methods" in OO programming) are encapsulated, an OO implementation of the unchained transactional model provides the freedom to perform transactional operations in a different environment from the client program that invokes them. For example, transactional operations may be performed by a server program connected for communication with the client program. This enables those transactional operations of the unchained model which do not have corresponding operations within the scope of a corresponding transaction according to the chained model to be executed separately from operations for which there is correspondence.

In a second aspect, the present invention provides a method, implemented in a data processing system including data processing resources which implement a first transactional model in which all transactional operations are performed within transactional scope, for interfacing between said resources and data processing resources which implement a second transactional model in which transactional operations may be invoked and performed outside of transactional scope, thereby to enable said resources to cooperate in the processing of a particular transaction, the method comprising: on issuance of a set of transactional operation requests according to said second transactional model, mapping said operation requests to corresponding operations of a transaction according to said first transactional model, including mapping operation requests which are issued outside of a transaction according to the second model to isolated transactions which are outside of any other transaction according to the first model; and storing a list of said operation mappings for the transaction.

Methods are provided which map between operations, maintain a list of such mappings, and facilitate policing of the protocols required for communication between the resources.

DESCRIPTION OF PREFERRED EMBODIMENTS

Embodiments of the invention will now be described in more detail, by way of example, with reference to the accompanying drawings in which.

A typical data processing system, on which the present invention may be implemented, comprises one or more central processing units (CPU), volatile memory, and an input/output controller managing data flows to and from magnetic or optical disk storage or other logically and electrically connected peripheral devices such as a display, a keyboard, data entry devices, printers, etc. A system communication controller manages communication across a network via a communication link. Such a system is well known in the art (for example, the commercially available IBM PS/2 computer or IBM RISC System/6000 computer) and so is not shown in the figures. The system has an operating system program (such as the OS/2 or AIX operating systems) installed thereon for controlling the system, and has transaction processing services either included in the operating system or as an additional system component. The transaction processing facilities provide support for commercial applications and data communications. (PS/2, RISC System/6000, OS/2 and AIX are trademarks of International Business Machines Corporation.)

The present invention is implemented using a computer program or suitable hardware which provide facilities for a data processing system such as described above.

While the invention relates generally to achieving interoperability between data processing resources which implement different transactional models, the invention is particularly useful in providing a solution to the mismatch between resources which support chained transactions, such as CICS transaction processing systems, and the unchained transactional model implemented in OTS. Such an implementation of the invention will now be described in detail.

IBM's CICS family of on-line transaction processing (OLTP) products provide transaction processing services across many operating systems, providing an environment for the execution of online application programs, including interfaces to files and database products, while ensuring data integrity. CICS systems are described in the IBM publication "CICS General Information", IBM Document No. GC33-0155-4.

CICS transactions are generally begun by an end user signing on to a CICS system and then invoking a particular application that they intend to use, generally by typing the transaction identification code (id) or using a predefined program function key. CICS looks up the transaction identifier in its internal Program Control Table where it finds out which program to invoke first to execute the requested transaction. Subsequent delimiting of the transaction is controlled by the CICS system's implicit management of units of work; CICS coordinates updates when a syncpoint request is received.

Client-server programming in CICS uses two application programming interfaces (APIs) that provide external access to CICS facilities, allowing non-CICS applications to gain access to CICS facilities and data:

External call interface (ECI)

External presentation interface (EPI)

Figure 2:
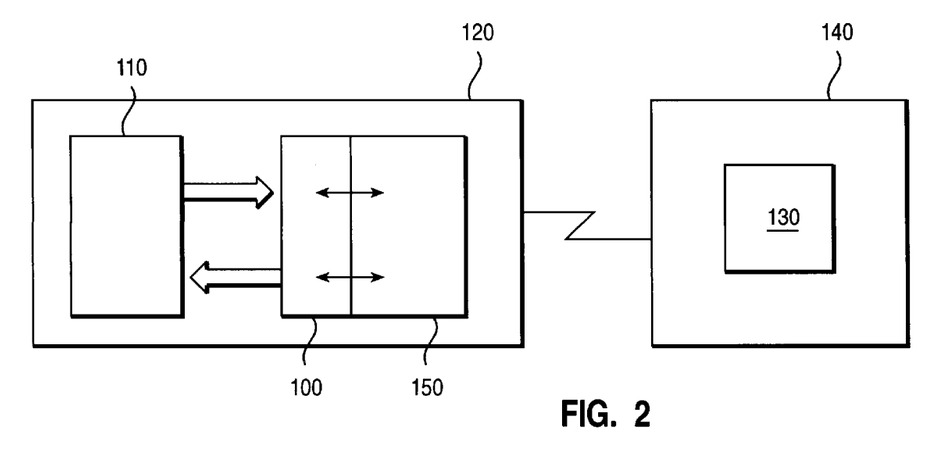
FIG. 2 is an illustration of use of the CICS External Call Interface for communication between a CICS client system and a CICS server system, as known in the prior art.

FIG. 2 illustrates the prior art use of the external interfaces 100 by a non-CICS application 110 which is located in a client system 120 and is using the facilities of CICS 130 in a server system 140. The CICS client software 150 processes the application's EPI and ECI requests, and transmits them to the server system using an appropriate communication protocol. Although FIG. 2 shows separate client and server systems, the configuration may be on a single workstation. The installation of a CICS client program on a data processing system enables that system to connect to an appropriate CICS server program. The communications between networked CICS systems may use mixed protocols (e.g. APPC LU6.2 sync level 1 between a CICS client system and a first CICS server system, and sync level 2 communication between the first server and a second CICS server in the network).

A server implementation of the external interfaces may also be provided, this being used for communication between different servers. Certain client systems can connect to any CICS server as long as the appropriate CICS client is installed (e.g. the program product IBM CICS Client for OS/2 on the OS/2 operating system enables connection to any CICS server product), whereas other client programs (in particular client programs for certain open systems platforms) provide for connection only to specific server systems.

The ECI allows a non-CICS application to call a CICS program in a CICS server and to initiate a CICS transaction. The application can be connected to several servers at the same time, and it can have several program calls outstanding at the same time. The CICS program can access and update all CICS resources except performing terminal input/output. Calls can be made by applications either synchronously (i.e. the application waiting until the called program has finished, with return information then being immediately available) or asynchronously (i.e. the application gets control back without reference to the completion of the called program, and uses a reply solicitation call to determine the outcome of the asynchronous request). The application can manage many logical units of work concurrently if it uses asynchronous calls. The called program can update resources on its own system, it can use distributed program link (DPL) to call CICS programs on other systems, and it can access resources on other CICS systems by function shipping, by distributed transaction processing (DTP), or in the CICS/MVS and CICS/ESA environments by the front end programming interface (FEPI). There is no coordination of recovery in CICS clients, but rather recovery is coordinated using log records maintained on a CICS server.

As compared with the basic model of chained transactions (where a program is always within the scope of a transaction), the CICS ECI affords greater flexibility by extending the concept of a chained transaction with the concept of a "mirror transaction". The CICS ECI allows a client program to execute outside the scope of a transaction but to invoke several CICS application programs under the scope of one or more transactions. The client program identifies these transactions by means of a logical unit of work identifier. An invocation of an application program (when the task implemented by that application program is selected to be performed) is termed a transaction scheduling. Much of the simplicity of the chained transactional model is retained.

The transaction programs, however, must always be separate from the client program, these being executed under the control of a server program. The transactional programs are always within the scope of a transaction as a consequence of the chained transaction model.

Most of the function of the ECI is provided in the "CICS_ExternalCall" part. This part has a single parameter, a pointer to the ECI parameter block, in which various fields describe the function to be performed and the inputs and outputs (e.g. an identifier "eci_transid" of a transaction under which the called program will run; an integer field "eci_extend_mode" determining whether a logical unit of work is terminated at the end of this call; an identifier "eci_luw_token" for a logical unit of work to which a call belongs; the name of a CICS server "eci_system_name"). The other part of the ECI, the "CICS_EciListSystems" part, is used to find out about available servers to which "CICS_ExternalCall" requests can be directed.

The calls to "CICS_ExternalCall" are of three types: program link calls which cause a CICS program to be executed on a CICS server; status information calls which retrieve status information about the type of system on which the application is running and its status; and reply solicitation calls which get information back after asynchronous program link or asynchronous status information calls. The type of call to "CICS_ExternalCall" is controlled by the setting of the "eci_call_type" parameter in the ECI parameter block.

An application that uses the asynchronous method of calling may have several program link and status information calls outstanding at any time. A parameter in the ECI parameter block, "eci_message_qualifier", is used on an asynchronous call to provide a user-defined identifier for the call. When a general reply solicitation call is made, the ECI uses the "eci_message_qualifier" field to return the name of the call to which the reply belongs. A specific reply solicitation call must include a value in the "eci_message_qualifier" field to identify the asynchronous call about which information is being sought.

An ECI application is often concerned with updating recoverable resources on the server. A logical unit of work is all the processing in the server that is needed to establish a set of updates to recoverable resources. When the logical unit of work ends normally, the changes will all be committed. When the logical unit of work ends abnormally, for instance because a program abends, the changes are all backed out. The ECI can be used to start and end units of work on the server.

On successful return from the first of a sequence of calls for a logical unit of work, the "eci_luw_token" field in the control block contains a token that should be used for all later calls related to the same logical unit of work. All program link calls for the same logical unit of work will be sent to the same server. A unit of work can thus be extended across multiple program link calls (but these may span a long time—for example over user think time—and the logical unit of work will be holding various locks and other CICS resources on the server which may cause delays to other users).

When a logical unit of work ends, the CICS server attempts to commit the changes. The last, or only, program link call of a logical unit of work is advised whether the attempt was successful.

Only one program link call per logical unit of work can be outstanding at any time. An asynchronous program link call is outstanding until a reply solicitation call has processed the reply.

Table 1 shows the use of combinations of "eci_extend_mode", "eci_program_name" and "eci_luw_token" parameter values to perform tasks associated with managing logical units of work through the ECI. In each case, appropriate values in other fields for the chosen call type must also be stored.

TABLE 1

Logical units of work in the ECI

| Task to perform | Parameters to use |
| --- | --- |
| Call a program that is to be the only program of a logical unit of work. | Set up the parameters as follows:<br>• eci_extend_mode: ECI_NO_EXTEND<br>• eci_program_name: provide it<br>• eci_luw_token: zero |
| Call a program that is to start a new logical unit of work that is to be extended. | Set up the parameters as follows:<br>• eci_extend_mode: ECI_EXTENDED<br>• eci_program_name: provide it<br>• eci_luw_token: zero |
| Call a program that is to be the last program of an existing logical unit of work, and commit the changes. | Set up the parameters as follows:<br>•eci_extend_mode: ECI_NO_EXTEND<br>• eci_program_name: provide it<br>• eci_luw_token: provide it |
| End an existing logical unit of work, without calling another program, and commit changes to recoverable resources. | Set up the parameters as follows:<br>• eci_extent_mode: ECI_COMMIT<br>• eci_program_name: null<br>• eci_luw_token: provide it |
| End an existing logical unit of work, without calling another program, and back out changes to recoverable resources. | Set up the parameters as follows:<br>• eci_extend_mode: ECI_BACKOUT<br>• eci _luw_token: provide it |

The CICS External Call Interface (ECI) is described more fully in the publication "CICS Family: Client/Server Programming", IBM Document Number SC33-1435-00.

The Object Transaction Service specification (referred to earlier, and described in OMG document 94.8.4 which is available from Object Management Group, Inc.) mentions the desirability of adding object implementations to existing procedural applications and augmenting object implementations with code which uses the procedural paradigm. It is recognised therein that achieving this aim in a transactional environment requires a single transaction to be shared by both the object and procedural code, but no solution is described for the problem of a mismatch between a procedural program that supports chained transactions and an OO program which supports the unchained transaction model.

The OTS provides transaction synchronisation across the elements of a distributed client/server system. A transaction can involve multiple objects performing multiple requests. The scope of a transaction is defined by a transaction context that is shared by the participating objects. Typically, a client first begins a transaction by issuing a request to an object defined by the OTS, which establishes a transaction context associated with the client thread. The context is either null, indicating that the thread has no associated transaction, or it refers to a specific transaction. The client then issues operation requests. These requests are implicitly associated with the client's transaction; they share the client's transaction context. Eventually, a client program (typically the one which originated the transaction) will end the transaction by issuing another request. If there were no failures, the changes produced as a consequence of the client's requests are then committed; otherwise, the changes are all rolled back. Any participant in a transaction can force the transaction to be rolled back by all participants.

In this scenario, the transaction context is transmitted implicitly to the objects, without direct client intervention. The OTS also supports scenarios where the client directly controls the propagation of the transaction context. For example, a client can pass the transaction context to an object as an explicit parameter in a request.

The OTS does not require that all requests be performed within the scope of a transaction. A request issued outside the scope of a transaction has no associated transaction context. It is up to each object to determine its behaviour when invoked outside the scope of a transaction; an object that requires a transaction context could raise a standard exception.

The OTS provides support for both single threaded and multi-threaded implementations. A client with an active transaction can make requests for the same transaction on multiple threads. Similarly, an object can support multiple transactions in parallel by using multiple threads.

The OTS specification includes a description of a number of interfaces including the "Current Interface" which defines operations that allow a client of the Transaction Service to explicitly manage the association between threads and transactions. The Current Interface also defines operations that simplify the use of the Transaction Service for most application programs. These operations are used by a client to begin and end (delimit) transactions and to obtain information about a current transaction.

The Current Interface defined operations are as follows:

Begin—This creates a new transaction. The transaction context of the client thread is modified so that the thread is associated with the new transaction. If the client thread is currently associated with a transaction, the new transaction is a subtransaction of that transaction.

Commit—The transaction associated with the client thread is completed (except if there is no associated transaction or if the client thread does not have permission to commit the transaction—in which cases exceptions are raised). If the transaction was begun by a thread (invoking Begin) in the same execution environment, then the thread's transaction context is restored to its state prior to the Begin request. Otherwise the thread's transaction context is set to null.

Rollback—The transaction associated with the client thread is rolled back (or exceptions are raised, as with commit). The modification of the client thread transaction context is as described above for Commit.

Rollback_Only—The transaction associated with the client thread is modified so that the only possible outcome is to rollback the transaction (or an exception is raised if there is no associated transaction).

Get_Status—This operation returns the status of the transaction associated with the client thread (unless there is no associated transaction).

Get_Transaction_Name—Returns a printable string describing the transaction. The returned string is intended to support debugging. An empty string is returned if there is no associated transaction.

Set_Timeout—Modifies a state variable associated with a target object that affects a time-out period associated with top-level transactions created by subsequent invocations of the Begin operation.

Get_Control—A control object is returned that represents the transaction context currently associated with the client thread (or a null object reference is returned if no associated transaction). This object can be given to the Resume operation to reestablish this context in the same thread or different thread.

Suspend—An object is returned that represents the transaction context currently associated with the client thread. This object can be given to the Resume operation to reestablish this context in the same thread or a different thread. Suspend causes the client thread to be associated with no transaction.

Resume—If the parameter is valid in the current execution environment (and is not a null object reference), the client thread becomes associated with that transaction in place of any previous transaction. Suspend and Resume operations permit multiple concurrent transactions.

In addition to the above operations, a specific Current Interface extension for use with the CICS ECI is the operation:

Mark for Commit—This is an optimisation which avoids the overhead of an additional message pair when using a remote server in the common case where it is known that commitment will be required on completion of an operation.

Figure 3:
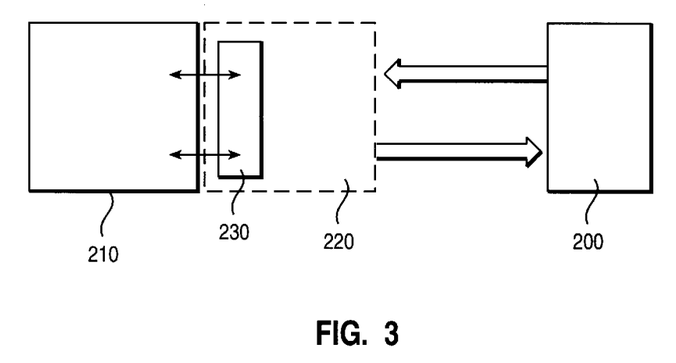
FIG. 3 is a representation of the relationships between resources of a data processing system which are used in the processing of a transaction, according to an embodiment of the invention.

The gap between the dynamic, explicit transactional demarcation required by the OTS and the chained transaction concept of CICS OLTP monitor programs is bridged by the provision of a set of object classes which map between operations of the CICS External Call Interface and operations of the object oriented OTS Current Interface. An overview of the relationship between the set of object classes and other resources of a data processing system is shown in FIG. 3. An object oriented application 200 accesses transactional services of a transaction processing system 210 through the set of object classes 220, the object classes including an implementation of the Current Interface and an object oriented wrapper cooperating with the CICS ECI 230.

In this implementation of the invention, the standard OMG OTS Current Interface and the OMG-defined object classes which provide this interface are preserved, as is the CICS External Call Interface. Interoperation between programs which implement different transactional models is achieved by enabling a program to use the interface to which it is adapted and providing a mapping or translation between the respective operations of the interfaces and in particular ensuring that the mapping deals with operations which are within the scope of the transaction according to one model but are outside the scope of a transaction according to the different model. Use is made of the fact that encapsulation in the object oriented OTS environment and the flexibility of CICS ECI facilitate provision of a mapping between a transaction according to the chained model of a transaction and corresponding operations of a transaction according to the unchained model. Since the OTS standard is used, it becomes possible to control transactions in a consistent manner, with exactly the same operations, across multiple transaction services.

Figure 4:
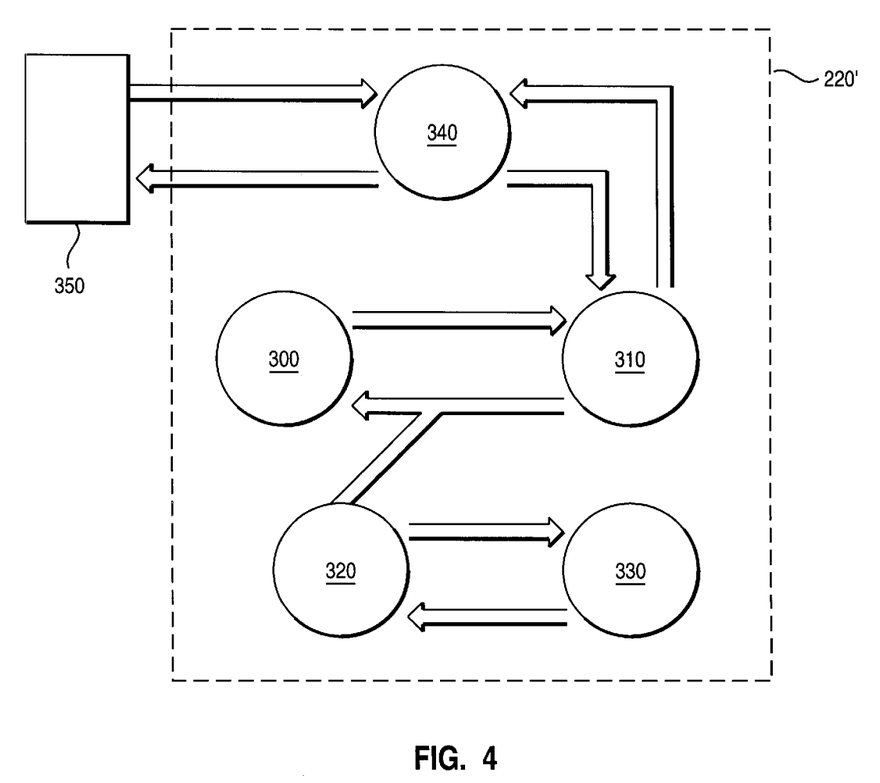
FIG. 4 is a representation of the relationships between objects of a set of object classes according to an embodiment of the invention.

The invention is thus implemented as a set of object classes which work together to provide the solution to the problem of mismatch between the two transactional models. An object class library structure in accordance with the invention is represented in FIG. 4. The class library comprises the following five object oriented classes:

An object oriented wrapper for the ECI (ECI object 300 is shown in FIG. 4);

An OTS Current Interface Implementation 310 designed to collaborate with the ECI wrapper to control transactions;

A Transaction class 320 for storing state information, supporting the mapping between the Current Interface definition of a transaction and CICS LUWs.

A Transaction Manager class 330 to manage a list of active transactions.

A high level Current Interface class 340.

The ECI and Current Interface Implementation objects carry most of the functionality, whereas the Transaction and Transaction Manager objects carry state information. These object classes will be described in more detail below, following an explanation of transactional concepts of the CICS ECI and OTS which are relevant to the implementation.

The CICS ECI concept of an "extended unit of work" permits multiple transaction schedulings to take place within the scope of one transaction. The OTS provides a designation of "transactional operation" which can be mapped to a transaction scheduling. Then, an OTS transaction can be mapped to an extended unit of work. Although an OTS transaction begins when a client program issues Begin, an extended unit of work only starts when the first transaction scheduling takes place (this is an optimisation over the OTS as it avoids a special operation). Mapping between an OTS transaction and an extended unit of work, and dealing with the discrepancy between when the transaction begins, is facilitated by an object class (the Transaction Class) which encapsulates the additional states. OTS permits multiple concurrent transactions by means of Suspend and Resume operations. These are mapped to multiple extended units of work (by means of the Transaction Manager object class).

The Transaction Class, which provides the mapping between transactions, holds state information for each active transaction. This information is retrieved and used to set ECI control parameters prior to a CICS program link call that is to be part of a LUW. After the ECI call has completed, other state information may be set. The information stored in this object class is as follows:

CICS Independent Transaction ID

ECI call type

ECI extend mode

ECI LUW Token

CICS four character Transaction ID

Rollback Only flag

First Call flag

Marked for Commit flag

Because CICS can support concurrent LUW's it is necessary to maintain the state information for all active transactions. A managed collection of all active transaction/LUW maps is required. This is achieved by managing a collection of Transaction Objects. Each Transaction Object is stored when the transaction becomes active, and is maintained until completion/cancellation of the transaction. This list supports such OTS operations as Suspend and Resume before a CICS LUW has commenced or even been identified. The above support is provided by the Transaction Manager Class, which is responsible for issuing, maintaining, and then destroying Transaction objects.

Of significance to enabling the CICS ECI to be controlled using the Current Interface operations, are operations which are required before and after an ECI program link call to enforce transactional control and to maintain transactional state between calls. The ECI Wrapper object class, as well as providing a wrapper for the ECI parameters, also provides an enhanced version of the CICS_External_Call function. This enhancement ultimately uses CICS_External_Call to actually make the CICS call, but its main function is to make sure that the correct transactional information is being used for each call, and that any necessary information is stored between calls. For example, after a first call of a LUW, it stores the ECI LUW Token and the four character CICS Transaction ID, so that these may be used on all subsequent calls belonging to the LUW. However, if the first call fails it must make sure that the transaction is cancelled. It also makes sure that appropriate transaction state updates are performed after an implicit Commit.

All operations on the high level Current Interface get passed down to the Current Interface Implementation object where they are mapped to ECI control block parameters. Tables 2a, 2b, and 2c show the flow of messages between the ECI object and the Current Interface implementation object when making a program link call.

The Current Interface Implementation is referred to as a "Controller" in the tables.

TABLE 2a

Making the call

| Stage | Operation/Message | Message Destination | Message Return |
|---|---|---|---|
| 1 | Is there Controller object? If Yes (3), if No (2). | | |
| 2 | Call CICS as normal. There is no Current Interface controlling transactions. | | |
| 3 | message: Get Transaction | Controller | Pointer to active transaction object, or NULL. |
| 4 | Is there an active transaction! If Yes (6), if No (5). | | |
| 5 | Call CICS as normal. There is no active transaction. | | |
| 6 | Set transactional information retrieved from Transaction Object:<br>• ECI Call Type<br>• ECI Extend Mode<br>• ECI LUW Token<br>• CICS Transaction ID<br>(not if first call) | | |
| 7 | mesaage: CICS_ExternalCall | CICS ECI | ECI return code |

TABLE 2b

After the first call on a LUW

| Stage | Operation/Message | Message Destination | Message Return |
|---|---|---|---|
| 1 | Did the CICS call complete successfully? If Yes (2), if No (3). | | |

TABLE 2b-continued

After the first call on a LUW

| Stage | Operation/Message | Message Destination | Message Return |
|---|---|---|---|
| 2 | message: SetLuw - passing LUW Token and CICS Transaction ID. | Controller | |
| 3 | message: Cancel - passing LUW Token and CICS Transaction ID. | Controller | |

TABLE 2c

After subsequent calls on a LUW

| Stage | Operation/Message | Message Destination | Message Return |
|---|---|---|---|
| 1 | Was the transaction in the Marked For Commit state (implicit commit)? If Yes (3), if No (2). | | |
| 2 | Nothing more to do! | Controller | |
| 3 | message: Committed - passing the CICS return code. | Controller | method return code |

The object classes of an implementation of the invention, identified above, will now be described in more detail:

ECI Wrapper Class

This class encapsulates the ECI parameter structure ("ECI_PARMS") which is used to store the parameters required for all CICS Client program link, reply request, and status information calls. Operations are provided to retrieve and modify parameter values in a controlled manner. It also provides a method that replaces the "CICS_ExternalCall" function, and allows ECI Wrapper objects to work with the Current Interface Implementation class providing simplified transactional control.

Data members of this class are:

The ECI_PARMS structure used to store the parameters used for ECI calls.

A pointer to the Current Interface Implementation object that provides transactional control for client ECI calls. This may be set to NULL if the functions of the Current Interface Implementation class are not required.

Operations of the class are:

Set private data member to the given Current Interface Implementation pointer. This will allow the ECI Wrapper object to "hand shake" with the Current Interface Implementation object.

Call CICS using the CICS_ExternalCall function, with the ECI parameters stored in the ECI Wrapper object. If a Current Interface Implementation object is controlling transactional scope, this method ensures that certain transactional state parameters are set in the Current Interface Implementation object. It also uses the Current Interface Implementation object to retrieve the LUW token, Extend Mode, CICS Transaction ID, and CICS system to be used in the ECI call. This information is obtained by requesting a pointer to the active Transaction object.

Get methods for the individual parameters of the CICS ECI control block.

Set methods for the individual parameters of the CICS ECI control block.

This OO wrapper is not the same as prior art OO wrappers which, while facilitating integration of procedural programs into OO environments, are not adapted to solving the problems addressed by the present invention.

Current Interface Implementation class

The Current Interface Implementation class works with the ECI Wrapper object class and the Transaction Manager class to control the transactional scope of program link calls. It invokes the methods of the Current Interface Implementation, ensuring that operations performed on the Current Interface are directed to their respective implementations. The functions of this class are accessed by a Current Interface pseudo object (as described in the aforementioned OTS specification).

The Current Interface Implementation class according to this implementation directs requests to the ECI implementation, but it could equally be extended to work with other object transaction services.

Data members

- A Boolean value indicating whether or not a transaction is active.
- A pointer to the ECI Wrapper object with which this object is cooperating.
- A pointer to the cooperating Transaction Manager object instance. This is the object that is responsible for issuing transactions.
- A count of the number of active transactions.
- A pointer to the Transaction object that is being used. This is obtained from the Transaction Manager.

Operations

- A method called by a Current Interface Implementation Destructor to Rollback any outstanding transactions before the object is destroyed. The return value of the method is a Boolean value indicating whether or not the function completed without any errors.
- A method which returns a pointer to the current Transaction object which contains the state of the active transaction (or returns a NULL value if no transaction is active).
- A method called by the cooperating ECI Wrapper object after the first program link call of a new transaction (LUW). It is only used if the first call was successful. Otherwise the Cancel method is used (see below). The purpose of this method is to set transactional state information in the Transaction object, so that all subsequent calls in the transaction will use the current CICS LUW token, CICS Transaction ID and system name.
- A method which returns a Boolean value to indicate whether or not there is an active transaction.
- A method called by the cooperating ECI Wrapper object when a call is made on a transaction that is "Marked for Commit". It is called to perform housekeeping work that would otherwise be performed by an explicit Commit call. Its return value is an integer specifying whether or not the Marked transaction was committed successfully.
- A method called by the cooperating ECI Wrapper object if the first call in a LUW fails. If a LUW token is returned (i.e. CICS started a LUW but the transaction abended), the transaction will be marked Rollback Only. Otherwise the current state information is reset. The return value is an integer indicating whether or not the call was successful.
- A method used to mark the beginning of a new transaction. It is not possible to Begin a new transaction if there is another transaction currently active. An integer is returned which indicates whether or not the call was successful.
- A method to Rollback the active transaction. The return value is an integer indicating whether the call was successful.
- A method to Commit the active transaction. Also returns an integer indicating whether call was successful.
- A method to Suspend the active transaction. This allows further transactions to be started using the Begin method. Returns integer indicating whether call was successful, and normally returning the ID of the suspended transaction.
- A method to Resume a transaction that has been Suspended. Returns integer indicating whether call was successful.
- A method which marks the current transaction such that it may only be Rolled Back. Returns a call indicating whether call was successful.
- Method to retrieve the ID of the active transaction, the ID normally being returned within an integer indicating whether call was successful.
- Method to retrieve the status of the current active transaction.

Transaction Class

The purpose of this class is to store transactional state information, and information necessary to enable Current Interface Implementation objects to interoperate with ECI Wrapper objects—supporting the mapping between the Current Interface concept of a transaction and CICS LUWs.

Data members

- An integer specifying a CICS independent ID for the transaction.
- A constant integer specifying the ECI call type that will be used when program link calls are made under the control of the Current Interface. Since only one asynchronous call may be outstanding in a CICS LUW, A there is almost nothing lost in forcing transactional calls to be run synchronously. Asynchronous calls can still be made outside transactional scope.
- An integer specifying the ECI extend mode to be used for program link calls.
- A Boolean indicating that the transaction can only be rolled back.
- A Boolean indicating whether or not the first call of a transaction has been made.
- A Boolean indicating that the next call within the transaction will be the last. Upon successful completion the transaction will be committed.
- An integer specifying the CICS LUW token. This is returned after the first successful call of a new transaction.
- The CICS Transaction ID under which the called transaction will run on the CICS server.
- A character indicating the CICS system to which calls will be directed.

There is no significant functionality provided by this class, since it is just used to hold transactional state information. Get and Set methods are provided for the above attributes.

Transaction Manager Class

This class has the purpose of managing a list of allocated (active) transactions, as represented by Transaction objects. A transaction becomes active when the Begin method returns successfully. It ceases to be active after a Commit (implicit or explicit), a Rollback, or a failure on the first CICS call. The list represents the concurrent LUW's that have been allocated to a process through the Current Interface.

Allocated transactions are stored in a linked list structure. This is a "light weight" collection, and is not implemented using CSet++ or MFC collection classes. The list is not a collection of pointers to Transaction objects but a list of "nodes" which store the pointers.

Data members

- An integer used to maintain a count of active transactions.
- An integer used for assigning unique transaction ID's. Each time a new transaction is started the counter is incremented and added to a base ID value.
- A pointer to an array of outstanding (active) transaction ID's. The purpose of this list is to allow the Current Interface Implementation object to rollback any outstanding transactions when it is destroyed. The first element of the array (element 0) indicates the number of ID's contained in the array.
- A pointer to the head of the linked list of Transaction objects.
- A pointer to the current position in the linked list. This will always point to the end of the list and is used mainly as an insertion place holder.
- An integer used to maintain a count of the nodes stored in the linked list. This value should be the same as the count of active transactions.
- A Boolean value to indicate whether or not the linked list of Transaction objects has been created.

This class contains a set of operations for manipulating the linked list of Transaction objects. The operations are as follows:

- A method used by Current Interface Implementation objects to request a new transaction (CICS LUW). A Transaction object will be created and stored in a collection. The pointer to the new transaction object is then returned to the caller.

This method may also be used to request a transaction object that was previously allocated. In this situation the given transaction ID is used to reference the object. If an incorrect ID is given then a NULL pointer will be returned.

- A method which returns the transaction identifier to the Transaction Manager. The transaction with the given ID will be deleted and the count of active transactions decremented.
- A method which returns a pointer to an array containing the ID's of outstanding (active) transactions. These may then be used to get the transactional information required to Rollback or Commit a transaction. The first element in the list indicates the number of ID's stored.

We claim:

1. A data processing system including data processing resources which implement a first transactional model, in which all transactional operations are performed within transactional scope, and means for interfacing between said resources and data processing resources which implement a second transactional model, in which transactional operations may be invoked and performed outside of transactional scope, thereby to enable interoperation between said different resources in the processing of a transaction, the means for interfacing including:

means for mapping between transactional operations according to the second model and transactional operations according to the first model, said mapping including designating transactional operations of said second model which are invoked outside of a first transaction as separate transactions according to the first model which are isolated from said first transaction;

an object oriented wrapper for said external interface;

an implementation of an interface in accordance with said second model which is adapted to cooperate with said object oriented wrapper to control transactional scope;

an object class to map operations of said second model interface to operations of said external interface, and to maintain transactional state information;

an object class to maintain a list of active transactions; and means for maintaining a list of said operation mappings for the transaction.

2. A system according to claim 1, including means for maintaining transactional state information for an active transaction, the maintenance of state information including assigning transactional state information to a transaction representing transactional operations which are outside of transactional scope according to the second model.

3. A system according to claim 2, wherein said state information is maintained by managing a collection of transaction objects, instances of said transaction objects being created and stored when a transaction becomes active and being maintained by the system, to support operations in the second model not supported in the first model, until completion or cancellation of the transaction.

4. A system according to claim 1, wherein said resources implementing the first transactional model include a client program suitable for cooperation with a server program in accordance with the client-server model of data processing, said client program being able to execute outside of transactional scope and being able to invoke a plurality of transaction programs within the scope of one or more transactions.

5. A system according to claim 1, wherein said resources implementing the first transactional model include a client program suitable for cooperation with a server program in accordance with the client-server model of data processing, said interface means being adapted to mark all transactional operations according to said second model and to request the services of a server system in performing said marked transactional operations.

6. A system according to claim 1, which supports a plurality of concurrent transactions, the means for interfacing being adapted to maintain state information and a list of operation mappings for all active transactions.

7. A data processing system including data processing resources which implement a first transactional model, in which all transactional operations are performed within transactional scope, said resources having a first external interface, and means for interfacing between said resources and data processing resources which implement a second transactional model, in which transactional operations may be invoked and performed outside of transactional scope, thereby to enable interoperation between said different resources in the processing of a transaction, the means for interfacing including a set of object classes including:

an object oriented wrapper for said external interface to said data processing resources which implement said first model;

an implementation of an interface in accordance with said second model which is adapted to cooperate with said object oriented wrapper to control transactional scope;

an object class for mapping between transactional operations according to the second model and transactional operations according to the first model, and to maintain transactional state information for active transactions; and an object class for maintaining a list of said operation mappings for active transactions;

wherein said mapping includes designating transactional operations of said second model which are invoked outside of a first transaction as separate transactions according to the first model which are isolated from said first transaction.

8. A method, implemented in a data processing system including data processing resources which implement a first transactional model in which all transactional operations are performed within transactional scope, for interfacing between said resources and data processing resources which implement a second transactional model in which transactional operations may be invoked and performed outside of transactional scope, thereby to enable said resources to cooperate in the processing of a particular transaction, the method comprising:

on issuance of a set of transactional operation requests according to said second transactional model, mapping said operation requests to corresponding operations of a transaction according to said first transactional model by means of a first object class, including mapping operation requests which are issued outside of a transaction according to the second model to isolated transactions which are outside of any other transaction according to the first model;

storing a list of said operation mappings for the transaction by means of a second object class;

interfacing to data processing resources which implement the second transactional model through an object oriented wrapper for processing transactions;

controlling transactional scope of transactions in data processing resources which implement either the first or the second transactional models; and designating transactions of the second model invoked outside of a first transaction as separate transactions according the first model.

9. A method according to claim 8, including the step of maintaining transactional state information for an active transaction, the maintenance of state information including assigning transactional state information to a transaction representing transactional operations which are outside of transactional scope according to the second model.

10. A method according to claim 9, wherein said state information is maintained by managing a collection of transaction objects, instances of said transaction objects being created and stored when a transaction becomes active and being maintained by the system, to support operations in the second model not supported in the first model, until completion or cancellation of the transaction.

11. A method according to claim 9, including maintaining state information and a list of operation mappings for a plurality of active transactions.

12. A computer program product in a computer readable medium for interfacing data processing resources which implement a first transactional model, in which all transactional operations are performed within transactional scope, and data processing resources which implement a second transactional model, in which transactional operations may be invoked and performed outside of transactional scope, comprising:

means for mapping between transactional operations according to the second model and transactional operations according to the first model, said mapping including designating transactional operations of said second model which are invoked outside of a first transaction as separate transactions according to the first model which are isolated from said first transaction;

an object oriented wrapper for said external interface;

an implementation of an interface in accordance with said second model which is adapted to cooperate with said object oriented wrapper to control transactional scope;

an object class to map operations of said second model interface to operations of said external interface, and to maintain transactional state information;

an object class to maintain a list of active transactions; and means for maintaining a list of said operation mappings for the transaction.

13. The product according to claim 12, including means for maintaining transactional state information for an active transaction, the maintenance of state information including assigning transactional state information to a transaction representing transactional operations which are outside of transactional scope according to the second model.

14. The product according to claim 13, wherein said state information is maintained by managing a collection of transaction objects, instances of said transaction objects being created and stored when a transaction becomes active and being maintained by the system, to support operations in the second model not supported in the first model, until completion or cancellation of the transaction.

15. The product according to claim 12, wherein said resources implementing the first transactional model include a client program suitable for cooperation with a server program in accordance with the client-server model of data processing, said client program being able to execute outside of transactional scope and being able to invoke a plurality of transaction programs within the scope of one or more transactions.

16. The product according to claim 12, wherein said resources implementing the first transactional model include a client program suitable for cooperation with a server program in accordance with the client-server model of data processing, said interface means being adapted to mark all transactional operations according to said second model and to request the services of a server system in performing said marked transactional operations.

17. The product according to claim 12, which supports a plurality of concurrent transactions, the means for interfacing being adapted to maintain state information and a list of operation mappings for all active transactions.

* * * * *

UNITED STATES PATENT AND TRADEMARK OFFICE
CERTIFICATE OF CORRECTION

PATENT NO : 5,872,971
DATED : Feb. 16, 1999
INVENTOR(S) : Knapman, et al

It is certified that error appears in the above-identified patent and that said Letters Patent is hereby corrected as shown below:

Column 11, under TABLE 1, line 32, please delete from column 1
"*eci__luw__ taken; zero" should read  -- *eci___luw___token; zero --
, under TABLE 1, line 32, please add to column 2
"*eci__luw__ taken; zero" should read  -- *eci___luw___token; zero --
under TABLE 1, line 37, please delete from column 1
"*eci_luw_token; provide it";
under TABLE 1, line 37, please add to column 2
"*eci_luw_token; provide it";
Claim 7, Column 21, line 2, please delete "transactional state information for active".

Signed and Sealed this

Twenty-fourth Day of August, 1999

Attest:

Q. TODD DICKINSON

*Attesting Officer*       *Acting Commissioner of Patents and Trademarks*